United States Patent [19]

Gelenius

[11] 3,732,436
[45] May 8, 1973

[54] APPARATUS FOR SUPPLYING CURRENT THROUGH A LOAD APPROXIMATING A SINGLE CYCLE OF A SINE WAVE IN RESPONSE TO AN INCREASING SIGNAL VOLTAGE

[75] Inventor: Robert B. Gelenius, Davison, Mich.
[73] Assignee: General Motors Corporation, Detroit, Mich.
[22] Filed: Nov. 5, 1971
[21] Appl. No.: 196,015

Related U.S. Application Data

[62] Division of Ser. No. 34,981, May 6, 1970, Pat. No. 3,636,447.

[52] U.S. Cl. ............... 307/229, 235/197, 307/261, 307/268, 328/13, 328/142
[51] Int. Cl. ............................................. G06g 7/12
[58] Field of Search ............... 328/13, 14, 59–62, 328/142; 307/229, 261, 268; 235/197

[56] References Cited

UNITED STATES PATENTS

| | | | |
|---|---|---|---|
| 3,350,575 | 10/1967 | Crouse | 307/261 |
| 3,458,729 | 7/1969 | Klein | 307/229 X |
| 3,462,618 | 8/1969 | Miyata | 307/229 |
| 3,596,185 | 7/1971 | Gschwandtner | 307/229 X |
| 2,544,790 | 3/1951 | Hornfeck | 328/13 |

*Primary Examiner*—Stanley D. Miller, Jr.
*Attorney*—C. R. Meland et al.

[57] ABSTRACT

A wide angle electrical gauge having two coils whose magnetic axes are at right angles. A signal source supplies a signal whose magnitude is proportional to the magnitude of the condition to be indicated. A sine generator is responsive to the output of the signal source and controls the current through one of the coils in a manner such that the magnetic field along its magnetic axis varies in an approximated sinusoidal fashion. A cosine generator is responsive to the output of the signal source and controls the current through the remaining coil in a manner so as to generate a magnetic field along its magnetic axis which is phase shifted from the magnetic field generated by the sine generator so as to take the form of an approximated cosine waveform in relationship thereto. A magnetic armature aligns itself with the resultant of the two magnetic fields whose angular position corresponds to the magnitude of the condition being measured.

2 Claims, 5 Drawing Figures

APPARATUS FOR SUPPLYING CURRENT THROUGH A LOAD APPROXIMATING A SINGLE CYCLE OF A SINE WAVE IN RESPONSE TO AN INCREASING SIGNAL VOLTAGE

This is a division of application Ser. No. 34,981, filed May 6, 1970.

This invention relates to function generators and, more specifically, this invention relates to a novel function generator which controls the current through a load in a sinusoidal manner.

It is the object of this invention to provide a circuit for generating a signal which varies in a sinusoidal fashion as an input signal varies from a first to a second level.

The invention may be best understood by reference to the following detailed description of a preferred embodiment and the accompanying drawings, in which.

Figure 1:
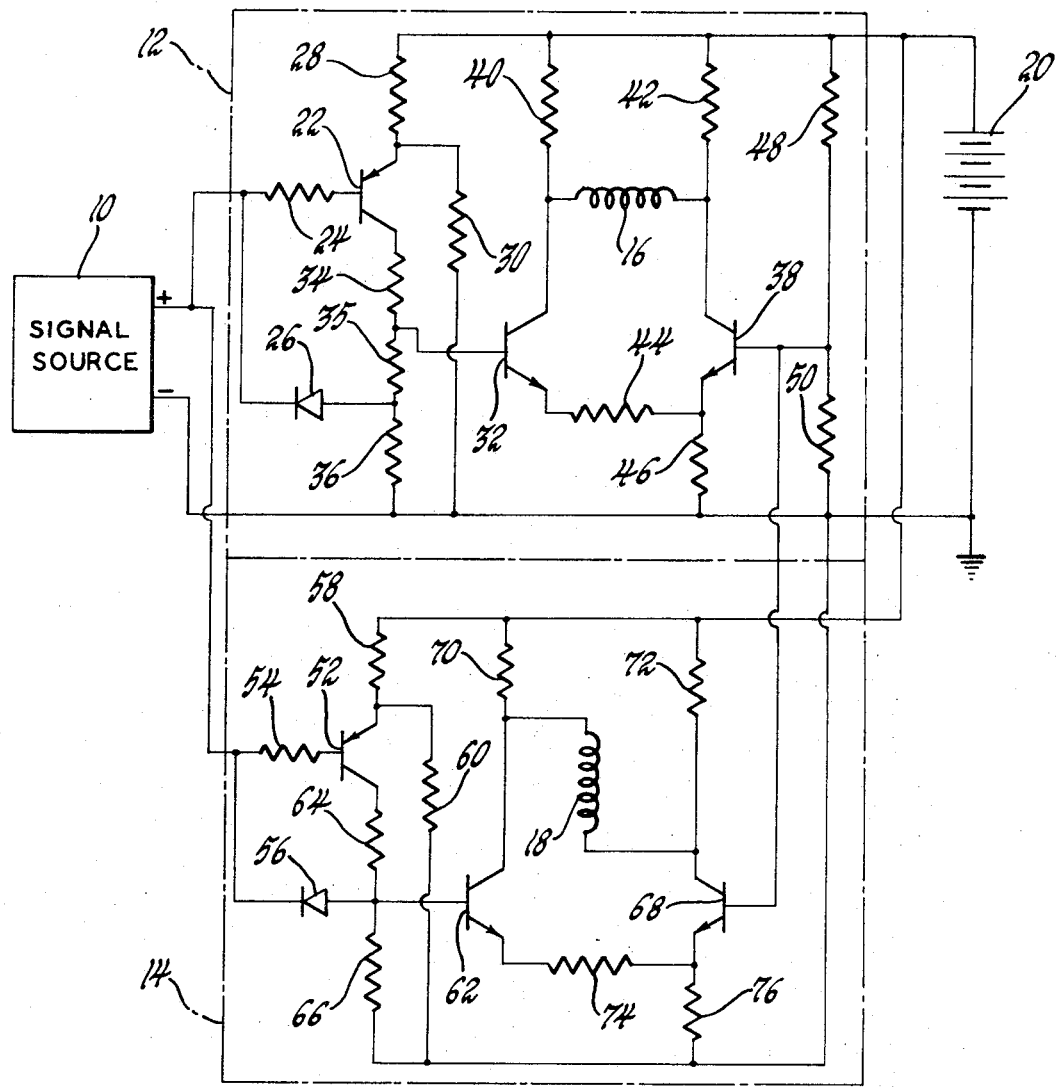
FIG. 1 is a schematic circuit diagram of a preferred embodiment of the invention.

Referring to FIG. 1, the circuit shown may be taken to represent an application of the invention to an electrical tachometer for indicating engine speed in revolutions per minute. The circuit is comprised of a signal source 10 which may be a tachometer generator capable of producing a DC voltage proportional to engine speed. The source 10 may be taken to represent any other form of signal voltage generator, the output of which is indicative of conditions at a remote point. For example, a suitable potentiometer arrangement may be employed for producing a DC voltage proportional to fuel level. The signal source 10 has the negative terminal thereof connected to ground, as shown, and the positive terminal connected to a sine generator 12 and to a cosine generator 14. The sine generator 12 controls the current through a coil 16 and the cosine generator 14 controls the current through a coil 18. A DC source 20 supplies operating power to the sine generator 12 and the cosine generator 14.

The positive terminal of the signal source 10 is connected to the base of a PNP transistor 22 in the sine generator 12 through a resistor 24 and to the cathode of the diode 26. The emitter of the transistor 22 is connected to the positive terminal of the DC source 20 through a resistor 28 and to ground through a resistor 30. The collector of the transistor 22 is connected to the base of an NPN transistor 32 through a resistor 34. The base of the transistor 32 is connected to the anode of the diode 26 through a resistor 35. The anode of the diode 26 is connected to ground through a resistor 36. The coil 16 is connected between the collectors of the transistor 32 to an NPN transistor 38 which in turn are connected to the positive terminal of the DC source 20 through the resistors 40 and 42 respectively. A resistor 44 is connected between the emitters of the transistors 32 and 38. In addition, the emitter of the transistor 38 is connected to ground through a resistor 46. The base of the transistor 38 is connected to the positive terminal of the DC source 20 through a resistor 48 and to ground through a resistor 50.

The positive terminal of the signal source 10 is also connected to the base of a PNP transistor 52 in the cosine generator 14 through a resistor 54 and to the cathode of a diode 56. The emitter of the transistor 52 is connected to the positive terminal of the DC source 20 through a resistor 58 and to ground through a resistor 60. The collector of the transistor 52 is connected to the base of an NPN transistor 62 through a resistor 64. The base of the transistor 62 is connected to the anode of the diode 56 and to ground through a resistor 66. The coil 18 is connected between the collectors of the transistor 62 and an NPN transistor 68 which in turn are connected to the positive terminal of the DC source 20 through the resistors 70 and 72 respectively. A resistor 74 is connected between the emitters of the transistors 62 and 68. In addition, the emitter of the transistor 68 is connected to ground through a resistor 76. The base of the transistor 68 is connected to the positive terminal of the DC source 20 through the resistor 48 and to ground through the resistor 50 in the sine generator 12.

Figure 2:
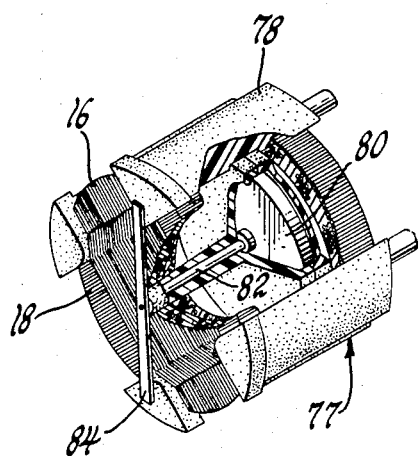
FIG. 2 is a partially broken away isometric view of a means for properly positioning the coils of the circuit of FIG. 1.

Referring to FIG. 2, there is shown an arrangement of the coils 16 and 18 in an air core gauge 77. The coils 16 and 18 are wound on a gauge body 78 and are mutually perpendicular with the axes thereof intersecting at a point in the center of the coils. Located centrally of the windings 16 and 18 is a permanent magnet armature 80 in the form of a flat round disk which is diametrically magnetized. The plane of the armature 80 lies parallel to the plane of the axes of the coils 16 and 18. Therefore, the armature 80 is within the joint influence of the fields produced by the coils 16 and 18. The armature 80 is rotatably mounted on a shaft 82 which extends to the center of the armature 80 and is perpendicular thereto. Mounted on the external end of the shaft 82 is an indicator needle 84, the angular position of which is indicative of the magnetic field relation between the coils 16 and 18.

Each of the windings 16 and 18 may produce, according to the direction and the value of current therethrough, a magnetic field in either direction along its magnetic axis. By suitably varying the direction and magnitude of the current input to each of the respective coils 16 and 18, the resultant magnetic field produced by the coils 16 and 18 may be made to vary in direction along the plane which is defined by the axes of the windings 16 and 18. The magnetic armature 80 will be aligned according to the known principle of magnetic attraction with the resultant field. Rotation of the armature 80 thus carries the indicator needle 84 through an angular displacement corresponding to the angular displacement of the resultant magnetic field.

The operation of the circuit of FIG. 1 will now be described with reference to FIG. 3 in which the waveform 86 represents the current through the coil 16 and the waveform 88 represents the current through the coil 18 both of the coil currents being a function of the magnitude of engine speed as represented by the signal voltage at the output of the signal source 10. When the output of the signal source 10 is zero, the transistor 22 is in saturation and the transistor 32 is biased near cutoff. The base bias of the transistor 38 as determined by the resistors 48 and 50 causes the transistor 38 to conduct. A resulting current flows through the resistor 40, the coil 16 and the transistor 38, which current will arbitrarily be called negative current for illustration purposes and is therefore shown as such in the waveform 86 in FIG. 3. The bias on the base electrode of the transistor 32 as determined by the potential across the resistor 35 and the forward drop of the diode 26 just exceeds the emitter potential of the transistor 38 such that the transistor 32 is just beginning to conduct. As the output signal voltage of the signal source 10 increases, the potential on the base of the transistor 32 increases to increase its conductivity. The negative current through the coil 16 from the resistor 40 decreases (approaches zero) linearly with the increase in the output signal voltage of the signal source 10 until the output signal voltage reaches a value A, at which value the potential at the collector of the transistor 32 equals the potential at the collector of the transistor 38. At this time, there is no current through the coil 16. Upon a further increase in the output signal voltage of the signal source 10, the transistor 32 increases its conduction to cause current to flow through the coil 16 from the resistor 42, which current will arbitrarily be called positive current for illustration purposes. The positive current through the coil 16 increases linearly with an increase in the output signal voltage of the signal source 10 until the output signal voltage reaches a value B, at which value the diode 26 becomes back-biased. At this value, the bias on the base of the transistor 32 and therefore the positive current through the coil 16 remains constant until the output signal voltage of the signal source 10 increases to a value C, at which time the transistor 22 begins to cut off. The base bias of the transistor 32 thereafter decreases linearly with an increase in the output signal voltage of the signal source 10 to decrease the conduction of the transistor 32 and decrease the positive current through the coil 16 until the output signal voltage reaches a value D at which time the potential at the collector of the transistor 32 again equals the potential at the collector of the transistor 38 which results in no current through the coil 16. Upon a further increase in the output signal voltage at the output of the signal source 10, the transistor 32 is further cut off with a resulting negative current through the coil 16. The negative current will increase through the coil 16 until the output signal voltage of the signal source 10 reaches a value E at which time the transistor 32 is cut off to cause a maximum negative current to flow through the coil 16. As seen by the waveform 86 in FIG. 3, the current through the coil 16 is a waveform which approximates a sinusoidal function.

The cosine generator 14 controls the current through the coil 18 in a similar manner as the sine generator 12 controlled the current through the coil 16 with the exception that the bias voltages on the transistors 52 and 62 are such that a phase shift is accomplished between the current through the coil 18 with reference to the coil 16.

Figure 3:
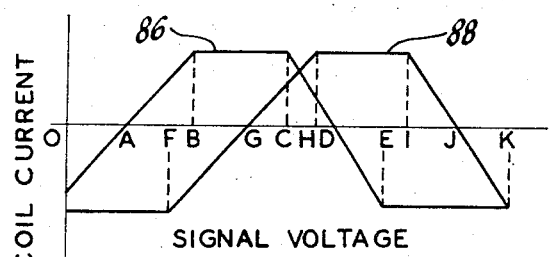
FIG. 3 is a plot of the individual coil currents against the magnitude of the condition at a remote point.

The current through the coil 18 has the following relationship to the output signal voltage of the signal source 10 which relationship is illustrated by the waveform 88 of FIG. 3. The current through the coil 18 is negative and constant until the output signal voltage of the signal source 10 reaches a value F at which time the negative current decreases (approaches zero) with an increase in the output signal voltage until the output signal voltage reaches a value G at which time there is no current through the coil 18. Thereafter, the current through the coil 18 is a positive current which increases with an increase in the output signal voltage of the signal source 10 until the output signal voltage reaches a value H after which the positive current is constant until the output signal voltage reaches a value I. The positive current then decreases with an increase in the output signal voltage of the signal source 10 until the output signal voltage reaches a value J at which time there is no current through the coil 18. Upon a further increase in the output signal voltage of the signal source 10, the current through the coil 18 is negative and increasing until the output signal voltage reaches a value K after which the negative current remains constant.

As can be seen from the illustrated waveforms 86 and 88, the currents through the coils 16 and 18 have an approximated sine and cosine relationship respectively.

Since the direction and magnitude of the magnetic fields generated by the coils 16 and 18 are directly proportional to the corresponding currents through the coils 16 and 18, the waveforms 86 and 88 in FIG. 3 also represents those magnetic fields.

Figure 4:
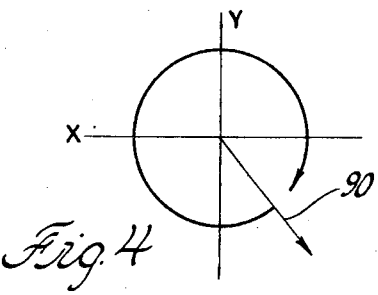
FIG. 4 is a flux field vector diagram illustrating the rotation of the resultant magnetic field vector rotation corresponding to the increase in the condition at the remote point.

FIG. 4 illustrates how the vector representing the resultant of the magnetic fields produced by the coils 16 and 18 of FIG. 1 rotates with reference to the increase in the output signal voltage of the signal source 10. The coil 16 generates a magnetic field aligned with the axis X and the coil 18 generates a magnetic field aligned with the axis Y. When the output of the signal source 10 is zero, the resultant of the magnetic fields generated by the currents through the coils 16 and 18 is represented by the resultant vector 90 positioned as shown. When the output signal voltage of the signal source 10 increases to a magnitude A, the resultant vector 90 rotates clockwise from the starting position as shown to align itself with the Y-axis which corresponds to the coil 18. When the output signal voltage of the signal source 10 increases to a magnitude between F and B where the currents through the coils 16 and 18 are equal, the resultant vector 90 will rotate clockwise to align itself midway between the X- and Y-axis. When the output signal voltage of the signal source 10 increases to a magnitude G, the current through the coil 18 decreases to zero and the current through the coil 16 is a maximum. The resultant vector 90 then aligns itself with the axis X corresponding to the coil 16. As can be seen, upon further increases in the output signal voltage of the signal source 10, the resultant vector will continue to rotate in a manner similar to that just described until it approaches the starting position shown when the output signal voltage reaches a value K. As can be seen as the output signal voltage of the signal source 10 increases from zero to K, the resultant vector 90 rotates nearly 360°.

Figure 5:
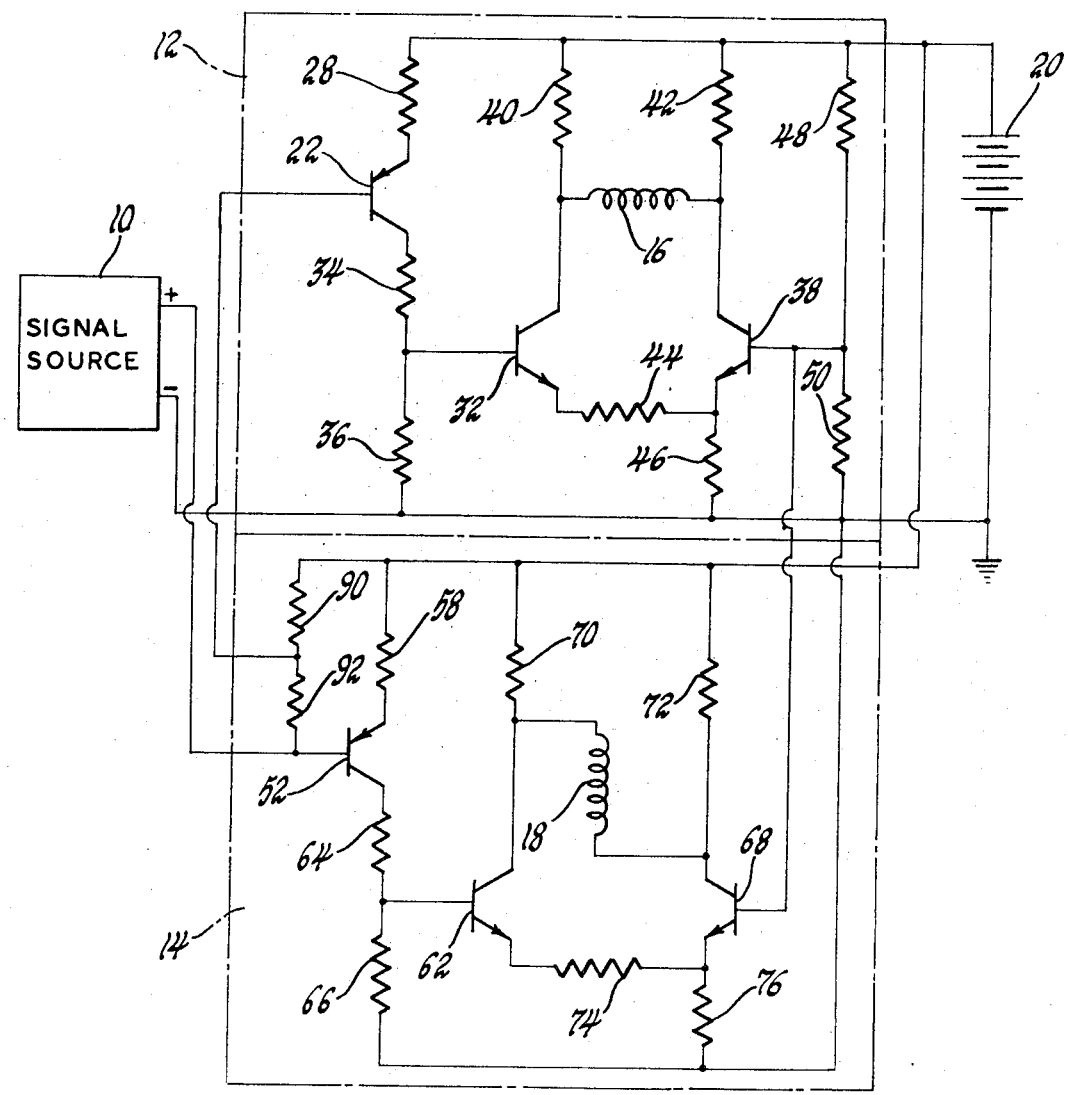
FIG. 5 is a schematic circuit diagram of another embodiment of the invention.

Another embodiment of the invention is shown in FIG. 5. Only that portion of the circuit is illustrated which shows the modifications to the circuit of FIG. 1.

The circuit elements which are common to both circuits retain the same reference numerals.

Referring to FIG. 5, the resistors 24, 30, 35, 54 and 60 and the diodes 26 and 56 of FIG. 1 are eliminated. The positive terminal of the signal source 10 is connected directly to the base of the transistor 52. The base of the transistor 52 is connected to the positive terminal of the DC source 20 through the resistors 90 and 92 and the base of the transistor 22 is connected to the positive terminal of the DC source 20 through the resistor 90.

The operation of the circuit of FIG. 5 is as follows: When the output of the signal source 10 is zero, the potential on the base of the transistor 22 is determined by the voltage dividing network comprised of the resistors 90 and 92. This bias is of a magnitude to cause the transistor 22 to be saturated and the transistor 32 to be just at its conduction level. As the output signal voltage of the signal source 10 increases, the potential at the emitter of the transistor 22 increases to increase the base bias of the transistor 32. The conductivity of the transistor 32 therefore increases with an increase in the output signal voltage of the signal source 10 until it is driven into saturation. The output of the transistor 32 will thereafter remain constant until the output signal voltage of the signal source 10 increase to drive the transistor 22 out of saturation after which the base bias of the transistor 32 decreases to decrease its conduction. The conduction of the transistor 32 continues to decrease with an increase in the output signal voltage of the signal source 10 until it is biased into cut off. As can be seen, the current through the coil 16 resulting from the above operation is represented by the waveform 86 in FIG. 3.

The operation of the cosine generator 14 in FIG. 5 is the same as the foregoing described operation of the sine generator 12 with the exception that the bias voltages on the transistors 52 and 62 are such that a phase shift is accomplished between the current through the coil 18 with reference to the coil 16. The resulting waveform through the coil 18 is represented by the waveform 88 in FIG. 3.

The sinusoidal function generator is described with reference to an air core gauge for illustration purposes only. The function generator may be used in other systems where a signal approximating a sine or cosine waveform is desired.

I claim:
1. A circuit for generating an approximate single cycle of a sine wave in response to an input quantity increasing from a first to a second value, comprising: a bias voltage generator responsive to the input quantity for generating a bias voltage increasing from a first bias voltage level to a second bias voltage level as the input quantity increases from the first value to a third value intermediate the first and second values and decreasing from the second bias voltage level to a third bias voltage level less than the first bias voltage level as the input quantity increases from the third value to the second value; first circuit means responsive to the bias voltage for supplying at a first output terminal a first output voltage varying between first and second magnitudes as the bias signal varies respectively between the first bias voltage level and a fourth bias voltage level intermediate the first and second bias voltage levels and remaining at the second magnitude as the bias voltage varies between the second and fourth bias voltage levels and remaining at the first magnitude when the bias voltage is less than the first bias voltage level; second circuit means for supplying at a second output terminal a second output voltage having a magnitude intermediate the first and second magnitudes of the first output voltage; and load means coupled between the first and second output terminals, whereby the current through the load varies as an approximate single cycle of a sine wave as the input quantity increases from the first to the second value.

2. The circuit in claim 1 wherein the first circuit means includes a transistor having a control electrode and means coupling the bias voltage to the control electrode, the transistor being biased into saturation when the bias voltage exceeds the fourth bias voltage level and is biased into nonconduction when the bias voltage decreases below the first bias voltage level.

* * * * *